United States Patent
Sadasivuni

(10) Patent No.: US 9,810,433 B2
(45) Date of Patent: Nov. 7, 2017

(54) INCLINED FUEL INJECTION OF FUEL INTO A SWIRLER SLOT

(71) Applicant: Siemens Aktiengesellschaft, Munich (DE)

(72) Inventor: Suresh Sadasivuni, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 567 days.

(21) Appl. No.: 14/374,901

(22) PCT Filed: Dec. 4, 2012

(86) PCT No.: PCT/EP2012/074331
§ 371 (c)(1),
(2) Date: Jul. 26, 2014

(87) PCT Pub. No.: WO2013/120558
PCT Pub. Date: Aug. 22, 2013

(65) Prior Publication Data
US 2015/0089952 A1 Apr. 2, 2015

(30) Foreign Application Priority Data
Feb. 15, 2012 (EP) ..................................... 12155539

(51) Int. Cl.
*F23R 3/28* (2006.01)
*F02C 7/22* (2006.01)
(Continued)

(52) U.S. Cl.
CPC ................ *F23R 3/286* (2013.01); *F02C 7/22* (2013.01); *F23C 7/004* (2013.01); *F23R 3/14* (2013.01);
(Continued)

(58) Field of Classification Search
CPC .. F23R 3/14; F23R 3/286; F23R 3/283; F23R 3/12; F23R 3/343; F23D 2900/14021;
(Continued)

(56) References Cited

U.S. PATENT DOCUMENTS 5,267,442 A   12/1993  Clark
5,761,906 A   6/1998   Norster
(Continued)

FOREIGN PATENT DOCUMENTS

CN   1407279 A      4/2003
CN   101278152 A   10/2008
(Continued)

*Primary Examiner* — Pascal M Bui Pho
*Assistant Examiner* — Alain Chau
(74) *Attorney, Agent, or Firm* — Beusse Wolter Sanks & Maire

(57) ABSTRACT

A combustor for a gas turbine is provided. The combustor includes a pre-combustion chamber having a center axis and a swirler which is mounted to the pre-combustion chamber. The swirler surrounds the pre-combustion chamber in a circumferential direction with respect to the center axis. The swirler has a bottom surface which forms a part of a slot through which oxidant/fuel mixture is injectable into the pre-combustion chamber, wherein the bottom surface is located in a bottom plane. The swirler further includes a fuel injector which is arranged to the bottom surface such that a fuel is injectable into the slot with a fuel injection direction, wherein a first component of the fuel injection direction is non-parallel to the normal (n) of the bottom plane.

11 Claims, 2 Drawing Sheets

(51) Int. Cl.
*F23R 3/14* (2006.01)
*F23C 7/00* (2006.01)
*F23R 3/34* (2006.01)

(52) U.S. Cl.
CPC .... *F23R 3/343* (2013.01); *F23C 2900/07001* (2013.01); *F23D 2900/14021* (2013.01)

(58) Field of Classification Search
CPC ........... F23D 2900/14701; F23D 14/02; F23C 2900/07001; F23C 7/002; F23C 7/004; F02C 7/22
See application file for complete search history.

(56) References Cited

U.S. PATENT DOCUMENTS

| | | | | |
|---|---|---|---|---|
| 5,822,992 | A * | 10/1998 | Dean | F23D 11/104 239/419.3 |
| 6,094,916 | A * | 8/2000 | Puri | F23R 3/12 60/39.37 |
| 6,141,967 | A * | 11/2000 | Angel | F23R 3/286 239/405 |
| 6,151,899 | A * | 11/2000 | Park | F23C 7/004 60/737 |
| 6,311,496 | B1 * | 11/2001 | Alkabie | F23C 7/004 239/402 |
| 6,470,684 | B2 * | 10/2002 | Wilbraham | F23C 99/001 239/690 |
| 7,703,288 | B2 | 4/2010 | Rogers | |
| 2001/0027637 | A1 * | 10/2001 | Norster | F23C 7/002 60/773 |
| 2004/0003596 | A1 * | 1/2004 | Chin | F23R 3/14 60/737 |
| 2004/0011058 | A1 | 1/2004 | Baudoin et al. | |
| 2005/0257530 | A1 * | 11/2005 | Zupanc | F23R 3/14 60/776 |
| 2006/0257807 | A1 * | 11/2006 | Hicks | F23R 3/286 431/354 |
| 2008/0041060 | A1 | 2/2008 | Nilsson | |
| 2009/0025395 | A1 * | 1/2009 | Nilsson | F23C 7/004 60/748 |
| 2009/0111063 | A1 * | 4/2009 | Boardman | F23C 7/004 431/8 |
| 2009/0205339 | A1 * | 8/2009 | Huang | F23R 3/14 60/737 |
| 2009/0277179 | A1 * | 11/2009 | Wilbraham | F23C 7/004 60/748 |
| 2009/0320485 | A1 * | 12/2009 | Wilbraham | F23R 3/14 60/748 |
| 2010/0065663 | A1 * | 3/2010 | Wilbraham | F23C 99/001 239/518 |
| 2010/0126176 | A1 | 5/2010 | Kim | |
| 2010/0223932 | A1 * | 9/2010 | Wilbraham | F23C 7/004 60/772 |
| 2010/0269508 | A1 * | 10/2010 | Saito | F23R 3/14 60/748 |
| 2010/0275602 | A1 * | 11/2010 | Cant | F23C 7/004 60/737 |
| 2012/0017595 | A1 * | 1/2012 | Liu | F23D 14/02 60/737 |

FOREIGN PATENT DOCUMENTS

| | | |
|---|---|---|
| DE | 102008019117 A1 | 10/2009 |
| EP | 0762057 A1 | 3/1997 |
| EP | 1835231 A1 | 9/2007 |
| EP | 2093488 A2 | 8/2009 |
| GB | 2439097 A | 12/2007 |
| RU | 2270402 C1 | 2/2006 |
| WO | 2009056425 A2 | 5/2009 |

* cited by examiner

INCLINED FUEL INJECTION OF FUEL INTO A SWIRLER SLOT

CROSS REFERENCE TO RELATED APPLICATIONS

This application is the US National Stage of International Application No. PCT/EP2012/074331 filed Dec. 4, 2012, and claims the benefit thereof. The International Application claims the benefit of European Application No. EP 12155539.5 filed Feb. 15, 2012. All of the applications are incorporated by reference herein in their entirety.

FIELD OF INVENTION

The present invention relates to a combustor for a gas turbine and to a method for operating a combustor.

ART BACKGROUND

It is an aim to reduce the temperature at a pilot burner face inside a combustor of a gas turbine and to reduce the emissions, such as nitrogen oxides NOx and/or carbon monoxide CO. The temperatures inside the combustion chamber cause higher CO and NOx emissions. In particular, inside the combustor, the mixing of fuel and gas (air) is considered as the critical issue in reducing the temperature and thereby in reducing the emissions.

Generally, a combustor comprises a swirler through which the fuel is injected typically in more than one stream e.g. as main fuel and pilot fuel. A pilot fuel is injected typically by a pilot burner, generally with a direction along a centre axis of the combustor, wherein the pilot fuel is used for controlling the combustor flame in which the main fuel in burned. The injected pilot fuel generates a predefined flame shape inside the combustor. The main fuel stream is provided via the swirler in a generally tangential direction into the combustor with respect to the centre axis of the combustor. The injected main fuel stream and the pilot fuel stream may be a liquid fuel or gaseous fuel. The combustion is achieved by a substantially non-combustible gas flow comprising an oxidant, first being mixed together with the fuel in the burner.

A high fuel concentration in the mixture of the gas, e.g. air and fuel inside the combustion chamber at the centre of the pilot burner close to the pilot face, may occur due to a back-circulation of the injected gas and fuel. Hence, it is an aim to reduce the concentration in the fuel rich mixture at the centre of the burner close to the pilot face and locate a reaction zone, where the ignition of the flame occurs, farther away from the pilot burner face to reduce high pilot burner temperatures.

WO 2009/056425 A2 discloses a combustor for a gas turbine which comprises a combustor with a burner head, a burner face and a radial swirler. The main fuel is injected through a swirler to a centre of the combustion chamber. Pilot fuel nozzles which are attached to the pilot face inject pilot fuel into the combustion chamber. A pilot fuel is injected with an individual swirl direction and with a pre-defined injection angle in order to modulate a desired flame profile inside the combustion chamber.

U.S. Pat. No. 5,267,442 A discloses a fuel nozzle with an eccentric primary circuit orifice. A fuel nozzle which includes an air swirler injects fuel directly to a prefilming surface of an air swirler.

U.S. Pat. No. 5,761,906 A discloses a fuel injector swirler arrangement comprising a shield element for generating fuel rich pockets in a gas or liquid fuel turbine. A stream of air is supplied through a swirler to a centre of the combustion chamber, wherein the stream of air is mixed with fuel which is injected by nozzles inside the swirler. Furthermore, shield means shields a supply of fuel from the air stream in at least one region of the injector arrangement such that fuel rich pockets of fluid are formed.

SUMMARY OF THE INVENTION

It may be an objective of the present invention to provide a combustion chamber with a proper flame profile.

This object is solved, in at least one embodiment of the invention, by a combustor for a gas turbine and in another embodiment by a method for operating the combustor according to the independent claims.

According to a first aspect of the present invention, a combustor for a gas turbine is presented. The combustor comprises a pre-combustion chamber and a swirler. The pre-combustion chamber has a centre axis. The swirler is mounted to the pre-combustion chamber wherein the swirler surrounds the pre-combustion chamber in a circumferential direction with respect to the centre axis. The swirler comprises a bottom surface which forms a part of a slot through which an oxidant/fuel mixture is injectable into the pre-combustion chamber. The bottom surface is located in a bottom plane. In particular, (e.g. at least one component of the normal of) the bottom plane is parallel to an axial direction with respect to the centre axis.

The swirler further comprises a fuel injector which is arranged to the bottom surface such that the fuel, in particular fuel gas, is injectable into the slot with a predefined fuel injection direction. A first component of the fuel injection direction is non-parallel to the normal of the bottom plane. In other words, the fuel injector does not inject the fuel with an injection direction which is parallel to the centre axis.

According to a further aspect of the present invention a method for operating the above mentioned combustor is presented. According to the method, fuel is injected into the slot with a fuel injection direction, wherein the first component of the fuel injection direction is non-parallel to the normal of the bottom plane.

The combustor may be an annular-type or a can-type combustor. The combustion chamber may have a cylindrical or oval shape. The combustion chamber may comprise a main combustion chamber and a pre-combustion chamber with a swirler section. The centre axis of the pre-combustion chamber may be a symmetry line of the pre-combustion chamber. At the swirler section, the swirler is mounted to the pre-combustion chamber and surrounds the pre-combustion chamber centre axis.

The swirler comprises slots through which the oxidant/fuel mixture, consisting of fuel and an oxidant, is injectable by several swirler streams into the combustion chamber. The swirler may be in particular a radial swirler. The fuel is injected by the fuel injector into the respective slot.

The oxidant/fuel mixture that flows through the slots of the swirler is directed generally tangentially with respect to the centre axis when entering within a respective stream into the pre-combustion chamber. Furthermore, the oxidant/fuel mixture is directed inside the pre-combustion chamber with a component parallel to the axial direction of the centre axis inside the pre-combustion chamber until the oxidant/fuel mixture enters the main combustion chamber.

A pilot burner comprising a burner face may be attached to the swirler section of the pre-combustion chamber. A pilot fuel injector is arranged to the pilot burner face for injecting pilot fuel into the pre-combustion chamber. The pilot fuel is injected generally along the axial direction of the centre axis of the pre-combustion chamber. Furthermore, the burner face may be located in particular within the bottom plane.

Through the slot of the swirler an oxidant is fed. The fuel injector injects fuel into the slot, such that the oxidant/fuel mixture is generated.

The oxidant may be for example air or compressed air. The fuel, which is injected by the fuel injector, may be in a gaseous state, i.e. fuel gas, or in a liquid state, i.e. liquid fuel.

The swirler is adapted for injecting the oxidant/fuel mixture, i.e. the oxidant, such as (compressed) air, and the fuel, into the pre-combustion chamber. The fuel may be injected into the slot of the swirler such that the oxidant/fuel mixture, i.e. the oxidant/fuel mixture, is generated. The oxidant/fuel mixture enters the pre-combustion chamber by the swirler. Furthermore, pilot fuel is injected by the pilot fuel injectors, wherein the pilot fuel runs generally in a direction along the axial direction. The pilot fuel guides the oxidant/fuel mixture injected by the swirler along the axial direction. In the centre region of the combustion chamber a back flow of the oxidant/fuel mixture occurs (which backflow is necessary for maintaining a continuous combustion) such that the combustion products from the oxidant/fuel mixture flows back in the centre section close to the pilot burner face. Hence, the so-called recirculation bubble of the oxidant/fuel mixture is formed, wherein the ignitioned oxidant/fuel mixture which is guided by the central back flow to the burner face generates at the centre of the pilot burner face hot temperatures.

According to conventional approaches, the fuel which is injected by the fuel injector into the swirler slot is injected with a fuel injection direction that is aligned parallel to the axial direction of the centre axis.

According to the approach of the present invention, the fuel is injected by the fuel injector with a fuel injection direction that has a first component which is non-parallel to the normal of the bottom plane and in particular which is non-parallel with the centre axis of the pre-combustion chamber.

In other words, the fuel injector injects the fuel into the swirler slot with a fuel injection direction that is directed with at least one first component which is non-parallel with respect to the centre axis. Hence, the fuel is guided closer to the bottom plane at the injection location into the combustion chamber and hence closer to the pilot burner face in comparison to a fuel injection direction which is parallel to the normal of the bottom plane and to axial direction of the centre axis of the pre-combustion chamber, respectively.

Hence, by providing a fuel injection direction which runs closer to the pilot burner face, the reaction zone, where a rich gas, i.e. oxidant/fuel, mixing fracture exists and is ignitioned, e.g. in the vicinity of the centre of the pilot burner face, is reduced, i.e. the diameter of the reaction zone is reduced. Hence, the centre section of the pilot burner face which is objected to high temperatures is reduced.

Hence, by injecting the oxidant/fuel mixture by the swirler in a flatter manner, i.e. with the first component which is non-parallel to the normal of the bottom plane and or with a component which is parallel to the bottom surface, the oxidant/fuel mixing fraction distribution in the centre region of the burner face of the pilot burner is positively affected. In particular, lower pilot tip temperatures at the pilot burner face are achieved. Furthermore, it is ensured that the rich oxidant/fuel mixing fraction in the centre region of the pilot burner face is spaced more efficiently from the burner face. Furthermore, fewer hot spots near the pilot face occur, so that localized high COx and NOx pockets, which may e.g. generate high emissions and soot deposits on or around the fuel injectors, are reduced. Furthermore, with the design change, i.e. the alignment of the fuel injector, a better flame stabilization, such as an improved flame stability and less combustion dynamics, is achieved.

The fuel injector is arranged to the bottom surface such that the (i.e. first component of the) fuel injection direction has an injection angle between the bottom plane and the fuel injection direction, wherein the injection angle is between (approximately) 20° and (approximately) 70°. A proper result may be achieved by providing an injection angle of (approximately) 45°, in an embodiment, where the fuel enters the slot of the swirler.

The fuel injector comprises an injection tube, wherein the injection tube is aligned with respect to the bottom surface such that the fuel is injectable into the slot with the fuel injection direction. Specifically, the tube may comprise a nozzle at an exit section of the fuel.

The injection tube may have a cylindrical shape comprising a centre axis. The injection tube extends along the centre axis. The injection tube may be aligned with respect to the bottom plane in such a way that the centre axis is parallel with the fuel injection direction. Hence, the injection tube and its centre axis are non-parallel with the normal of the bottom plane. In other words, the tube extends angular and oblique from the bottom surface of the swirler. Specifically, the injection tube comprises a fuel opening (e.g. a nozzle) which is formed at an end face of a free end of the injecting tube. Hence, if the injection tube is aligned with its centre axis parallel to the fuel injection direction, the fuel may exit through the fuel opening along the fuel injection direction from the end face of the injecting tube.

According to a further exemplary embodiment, the tube protrudes from the bottom surface into the slot. For example, the exit section of the tube may be spaced apart from the bottom surface of the swirler. Hence, a better flow characteristic of the oxidant/fuel mixture inside the slot of the swirler may be achieved.

According to a further exemplary embodiment, the swirler comprises a vane with a side wall which forms the slot together with the bottom surface. The fuel injector is further arranged to the bottom surface such that the fuel is injectable into the slot with a second component of the fuel injection direction. The second component is in particular approximately perpendicular to the side surface or wall. In other words, the fuel is injected against a side wall of the vane. Hence, turbulences may be generated, which may be beneficial for generating a homogeneous oxidant/fuel mixture and for forming the desired flame profile inside the combustion chamber.

Specifically, the vane may have three wall sections and may thus form a triangular shape, wherein the above mentioned sidewall, against which the fuel is injected with the further injection direction, is the largest wall section out of the three wall sections. Hence, the sidewall has the largest surface in comparison to the other two wall sections. Hence, the fuel is injected in a direction to the largest wall section (i.e. the side wall) of the vane which defines partially the slot.

According to a further exemplary embodiment, the swirler further comprises a further fuel injector which is arranged to the bottom surface. Hence, further fuel may be injected into the slot, so that inside the swirler the oxidant is mixed with the fuel. The further fuel may be a fuel gas or a liquid fuel. Hence, an oxidant/fuel mixture exits the swirler and flows into the combustion chamber. In particular, the fuel and the further fuel flowing through the slots of the swirler supply together in an operating state approximately 90% to 95% of the total gas turbine fuel requirement. The further fuel injector may inject the further fuel with the fluid injection direction and the further fuel injection direction as described above with respect to the fuel injector.

According to a further exemplary embodiment, the bottom surface forms a part of a further slot to which another fuel is injectable into the combustion chamber. The swirler further comprises another fuel injector which is arranged to the bottom surface such that another fuel is injectable into the further slot with another fuel injection direction. Another first component of the another fuel injection direction is non-parallel to the normal of the bottom plane.

In particular, a plurality of further slots with respective fuel injectors may be arranged throughout the circumferential direction of the swirler. Each of the plurality of slots may be formed by spaced circumferentially located vanes which are attached onto the bottom surface.

The bottom surface may particularly be a surface of a base plate of the swirler on which the swirler vanes are mounted or from which the swirler vanes raise. "Bottom" is meant as an axial end of the swirler in respect of the centre axis, preferably the axial end that is directed away from a main combustion chamber and directed towards a burner head.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiments but to which the invention is not limited.

DETAILED DESCRIPTION

Figure 1:
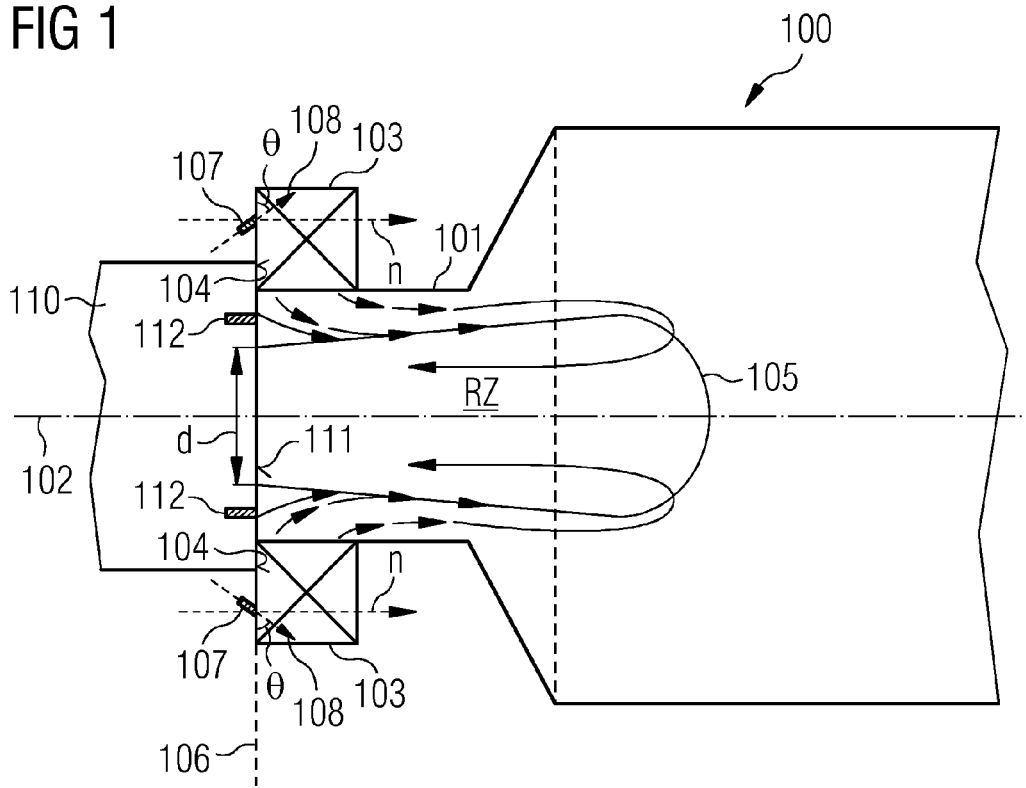
FIG. 1 shows a combustor for a gas turbine according to an exemplary embodiment of the present invention.

The illustrations in the drawings are schematical. It is noted that in different figures, similar or identical elements are provided with the same reference signs.

FIG. 1 shows a combustor 100 for a gas turbine. The combustor 100 comprises a pre-combustion chamber 101 having a centre axis 102 and a swirler 103 which is mounted to the pre-combustion chamber 101.

The swirler 103 surrounds the pre-combustion chamber 101 in a circumferential direction with respect to the centre axis 102. The swirler 103 comprises a bottom surface 104 which forms a part of a slot 201 (see FIG. 2) through which typically an oxidant/fuel mixture is injectable into the pre-combustion chamber 101. The bottom surface 104 is located in a bottom plane 106. In the exemplary embodiment shown in FIG. 1, a component of a normal n of the bottom plane 106 is parallel to an axial direction with respect to the centre axis 102.

The swirler 103 further comprises a fuel injector 107 which is arranged to the bottom surface 104 such that a fuel is injectable into the slot 201 with a fuel injection direction 108. Particularly the fuel injection direction 108 corresponds to the orientation of an outlet of the fuel injection 107.

As shown in FIG. 1, a first component of the fuel injection direction 108 is non-parallel to the normal n of the bottom plane 106.

In particular, the fuel injector 107 is arranged to the bottom surface 104 such that the fuel injection direction 108 has an injection angle $\Theta$ between the bottom surface plane 106 and the fuel injection direction 108, wherein the injection angle $\Theta$ is approximately 45°.

Furthermore, as shown in FIG. 1, a pilot burner 110 which comprises a burner face 111 is mounted to the swirler 103. In particular, the burner face 111 is located within or substantially parallel with the bottom plane 106. A pilot burner 110 comprises a pilot fuel injector 112 which is arranged to the burner face 111 for injecting pilot fuel into the pre-combustion chamber 101.

Pilot fuel is injected through the pilot fuel injectors 112 basically along the axial direction with respect to the centre axis 102. The pilot fuel forms a separation layer and a flame front 105. The pilot fuel injectors 112 may be located along a circumferential direction to the pilot burner face 111 such that the injected pilot fuel forms a central circular zone inside of which the fuel (i.e. the oxidant/fuel mixture) is burned. This central zone may be called the reaction zone RZ. Around the reaction zone RZ, i.e. between the walls of the pre-combustion chamber 101 and the separation layer generated by the pilot fuel, the oxidant/fuel mixture is injected by the swirler 103.

The fuel is injected into a slot 201 (see FIG. 2) of the swirler 103 by the fuel injectors 107 with the fuel injection direction 108. According to the present approach, the fuel injection direction 108 is inclined and non-parallel to the normal n of the bottom plane 106 and hence non-parallel to the centre axis 102. The oxidant/fuel mixture is injected by the swirler 103 into the pre-combustion chamber 101 and is guided after entering the pre-combustion chamber 101 by the pilot fuel along the axial direction of the centre axis 102. In a defined distance to the burner face 111 along the centre axis 102 the pilot fuel stream is weakened and the pre-combustion products of the oxidant/fuel mixture flows abruptly back to the pilot burner face 111 along the centre axis 102 inside a centre region and the reaction zone RZ, respectively.

Inside the slots 201 of the swirler 103, the oxidant may be mixed with the (main) fuel such that the thereby generated oxidant/fuel mixture may be ignitioned after passing the flame front 105. A hot spot is located near the burner face 111 in the central reaction zone RZ due to the backflow of the ignitioned oxidant/fuel mixture. A section of the burner face 111 in the reaction zone RZ has a defined diameter d. By the present approach, the diameter d of the section of the burner face RZ is reduced by the inclined fuel injection direction 108 of the fuel which is injected into the slot 201. As can be taken from FIG. 1, the fuel and hence the oxidant/fuel mixture is injected from the swirler 103 in a flat manner with respect to the bottom plane 106. The fuel injection direction 108 is non-parallel with respect to the normal n of the bottom plane 106. For this reason, also the diameter d of the section of the burner face 111 inside the reaction zone RZ is reduced and hence the overall heat on the pilot burner 110 is reduced as well.

Furthermore, the rich oxidant/fuel mixture inside the reaction zone RZ which is located close to the burner face 110 is reduced as well.

Figure 2:
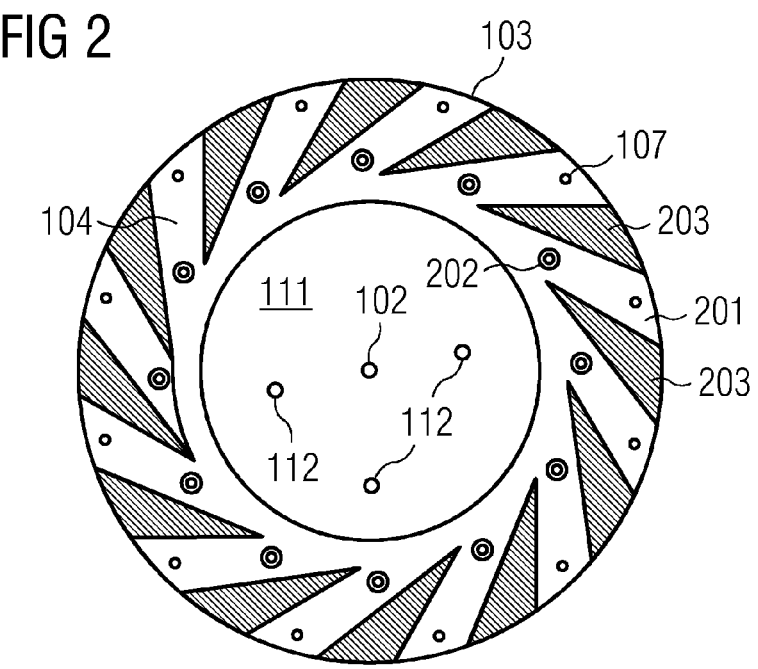
FIG. 2 shows a swirler according to an exemplary embodiment of the present invention.

FIG. 2 shows a detailed view of the swirler 103. The swirler 103 comprises a plurality of slots 201. Each slot 201 is formed by circumferentially spaced apart vanes 203 and the bottom surface 104. Oxidant/fuel mixture which flows through the slots 201 is directed approximately tangentionally with respect to the centre axis 102. In the centre of the swirler 103, the burner face 111 is shown. The pilot fuel injectors 112 may be arranged circumferentially around the centre axis 102 into the burner face 111.

The fuel injectors 107 are installed to some of the slots 201 or in particular to all slots 201, wherein through the fuel injectors 107 the fuel is injected into the slots 201 with the above described desired fuel injection direction 108.

Additionally, further fuel injectors 202 may be installed to some of the slots 201 or to all of the slots 201. The further fuel injectors 202 inject further (liquid or gaseous) fuel. The further fuel may be mixed inside the slots 201 with the fuel which is injected by the fuel injector 107 and with the oxidant.

Not all slots 201 and respective injectors 107, 202 are indicated with a respective reference sign to provide a better overview in FIG. 2.

Figure 3:
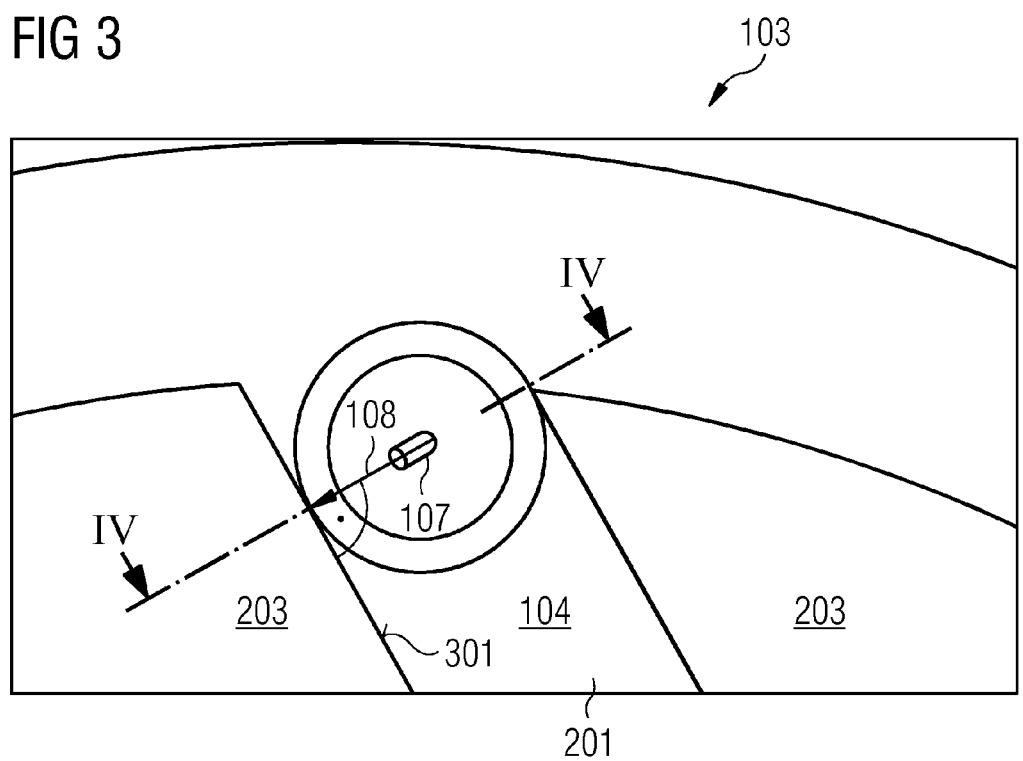
FIG. 3 shows a schematical view of a section of a swirler according to an exemplary embodiment of the present invention.

FIG. 3 shows a more detailed view of the section of the swirler 103. The slots 201 are formed by the bottom surface 104 and by the vanes 203. In FIG. 3, a second component of the fuel injection direction 108 is shown. As can be taken from FIG. 3, the second component of the fuel injection direction 108 is directed approximately perpendicular to a side wall 301 of the vanes 203. In particular, a further fuel injection angle of the second component of the fuel injection direction 108 between the second component of the fuel injection direction 108 and the side wall 301 is approximately 90° (degree). In other exemplary embodiments, the further fuel injection angle of the second component of the fuel injection direction 108 may be between 0° and 90°, for example (approximately) 45°. Hence, the further fuel injection angle of the second component of the fuel injection direction 108 may be directed in such a way, that the injected fuel (which is injected by the fuel injector 107) comprises at the region where the fuel leaves the fuel injector 107 a direction to the inner volume of the pre-combustion chamber 101 or a counter direction to the inner volume of the pre-combustion chamber 101.

Hence, by injecting the fuel with the fuel injector 107 with the injection angle and the further injection angle, turbulences in the injected fuel stream may be achieved such that better oxidant/fuel mixing properties are achievable.

Figure 4:
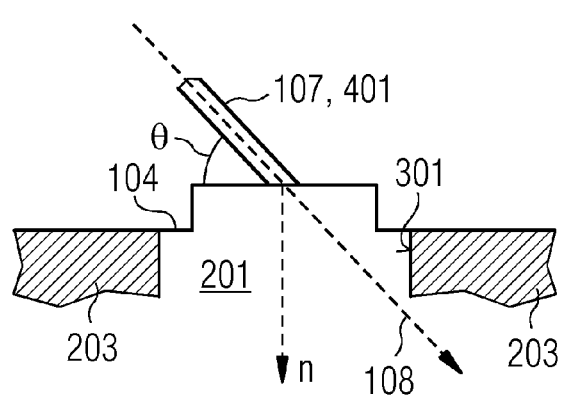
FIG. 4 shows schematically a sketch Iv-Iv of the swirler of FIG. 3 according to an exemplary embodiment of the present invention.

FIG. 4 shows the sketch Iv-Iv of FIG. 3. In FIG. 4, the fuel injector 107 is formed by a tube 401 through which the fuel may be injected with the preferred fuel injection direction 108. In particular, in FIG. 4, the first component of the fuel injection direction 108 is shown. The first component of the fuel injection direction 108 comprises the injection angle $\Theta$ between the bottom surface 104 and the second component of the fuel injection direction 108. Furthermore, in the sketch Iv-Iv of FIG. 4, the vanes 203 are shown which form the slot 201.

Furthermore, as can be taken from FIG. 4, the bottom surface 104 may comprise a groove wherein in a region of the groove, the fuel injector 107 is arranged. Alternatively, the fuel injector 107 may protrude from the bottom surface 104 into the slot 201 (not shown in FIG. 4).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A combustor for a gas turbine, the combustor comprising:
    a pre-combustion chamber having a center axis,
    a swirler mounted to the pre-combustion chamber,
    wherein the swirler surrounds the pre-combustion chamber in a circumferential direction with respect to the centre axis,
    wherein the swirler comprises a bottom surface which forms a part of a slot through which an oxidant/fuel mixture is injectable into the pre-combustion chamber,
    wherein the bottom surface is located within a bottom plane,
    wherein the swirler further comprises a fuel injector which is arranged such that a fuel is injectable into the slot through the bottom surface with a fuel injection direction,
    wherein a first component of the fuel injection direction is non-parallel to a normal (n) of the bottom plane,
    wherein the fuel injector comprises an injection tube, said injection tube is aligned with respect to the bottom surface such that the fuel is injectable into the slot with the fuel injection direction, and
    wherein the fuel injector is arranged such that an injection angle ($\Theta$) between the bottom plane and the fuel injection direction is between 20° and 70°,
    wherein the swirler comprises a vane comprising a side wall oriented transverse to the bottom surface and which forms a further part of the slot, wherein the fuel injector is arranged such that a second component of the fuel injection direction is into the slot and toward the side wall.

2. The combustor according to claim 1, wherein the injection angle ($\Theta$) is between 35° and 55°.

3. The combustor according to claim 1, wherein the injection tube protrudes from the bottom surface into the slot.

4. The combustor according to claim 1, wherein the second component of the fuel injection direction is perpendicular to the side wall.

5. The combustor according to claim 1, wherein the swirler further comprises a further fuel injector, wherein said further fuel injector is arranged in the bottom surface.

6. The combustor according to claim 1, wherein the bottom surface forms a part of a further slot through which a further oxidant/fuel mixture is injectable into the pre-combustion chamber, wherein the swirler further comprises an another fuel injector which is arranged in the bottom surface such that an another fuel is injectable into the further slot with a further fuel injection direction, and wherein a further first component of the further fuel injection direction is non-parallel to the normal (n) of the bottom plane.

7. The combustor according to claim 1, further comprising a pilot burner, said pilot burner comprising a burner face, wherein the pilot burner comprises a pilot fuel injector which is arranged in the burner face for injecting a pilot fuel into the pre-combustion chamber.

8. The combustor according to claim 7, wherein the burner face is located within the bottom plane.

9. The combustor of claim 1, wherein the fuel injector is configured to ensure the fuel is injected against the side wall of the vane.

10. The combustor of claim 1, wherein the second component is counter to a direction of a fluid flow through the slot.

11. A method for operating a combustor according to claim 1, the method comprising injecting the fuel into the slot with the fuel injection direction.

* * * * *